Aug. 24, 1965 P. J. KEANE ETAL Re. 25,842

POWER PLIERS

Original Filed Dec. 9, 1960

INVENTORS
Peter J. Keane
BY Floyd E. Burnell
Griffith Jones Jr.
Watts, Edgerton, Pyle & Fisher ATTORNEY United States Patent Office Re. 25,842
Reissued Aug. 24, 1965

25,842
POWER PLIERS

Peter J. Keane, Orangeburg, S.C., Floyd E. Burnell, Whitesboro, N.Y., and Griffith Jones, Jr., Orangeburg, S.C., assignors to Kelsey-Hayes Company, Detroit, Mich., a corporation of Delaware Original No. 2,990,613, dated July 4, 1961, Ser. No. 74,999, Dec. 9, 1960. Application for reissue May 19, 1964, Ser. No. 380,971
5 Claims. (Cl. 30—180)

Matter enclosed in heavy brackets [ ] appears in the original patent but forms no part of this reissue specification; matter printed in italics indicates the additions made by reissue.

This invention relates to power pliers and more particularly to fluid actuated power pliers.

One of the principal objects of this invention is to provide a fluid actuated power plier device.

A more particular object of this invention is to provide a power plier device which converts reciprocal motion caused by fluid actuation to pivotal movement in plier jaws.

Figure 1:
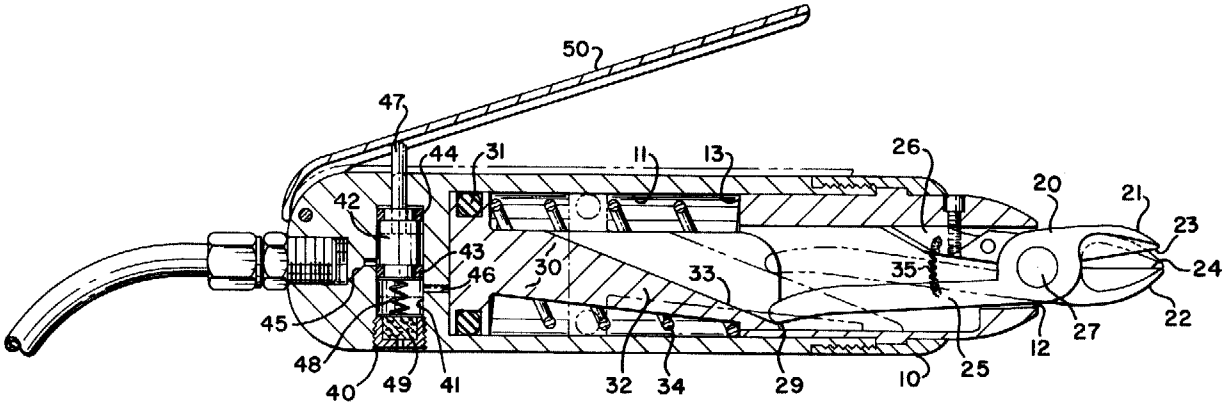
Figure 2:
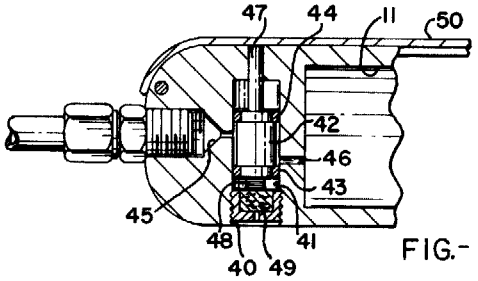

Other objects and a fuller understanding of the invention may be had by referring to the following description and claims taken in conjunction with the accompanying drawing in which:

FIGURE 1 is a sectional view of the new and improved fluid actuated power plier device; and, FIGURE 2 is a fragmentary sectional view of the fluid actuation end of the power plier in the closed position.

Referring now to the drawing, the new and improved power plier device includes a generally cylindrical housing 10 having a bottomed axial bore 11. The axial bore 11 defines a work piston chamber terminating at an end opening 12. A work piston 30 having a work rod 32 projecting from one face toward the end opening 12 is disposed in the work piston chamber. The work rod 32 has formed thereon an inclined cam track 33.

A plier assembly designated generally by reference character 20 is partially disposed in the work piston chamber. The plier assembly 20 includes first and second crossed levers 21, 22 pivotally connected at 27. The levers 21, 22 include first and second cutting jaws 23, 24 and first and second handles 25, 26 respectively. The handle 26 of the second lever 22 is rigidly affixed to the housing 10 internally of the bore 11. The end of the first handle 25 includes a cam follower 29 in operative engagement with the cam track 33. The first and second cutting ends 23, 24 project from the bore 11 through the opening 12. The first lever 21 is free to pivot about the pivotal connection 27 between a plier assembly closed position wherein the cutting jaws 23, 24 are relatively closely spaced and a plier assembly open position wherein the cutting jaws 23, 24 are relatively widely spaced. A spring 35 is provided which is in compressive engagement with the handles 25, 26 urging the plier assembly to the open position.

When the work piston 30 is at the rear of the work piston chamber as shown by the solid lines of the drawing, hereafter referred to as the rearward position, the cam follower 29 is positioned toward the extreme end of the cam track 33 and the plier assembly spring 35 urges the plier assembly into the open position. As the work piston 30 is driven forward in the bore the cam follower 29 rides up the cam track 33 and the lever 21 pivots to the closed position when the piston 30 reaches the forward position shown in phantom in the drawing, hereafter referred to as the forward position.

A fluid actuation system is provided at the end of the housing 10 away from the opening 12 and is designated generally as 40. The fluid actuation system 40 includes a control piston chamber 41 with a control piston 42 disposed therein. First and second spaced O-ring seals 43, 44 are provided adjacent the opposite ends of the control piston 42 and form a fluid tight region between themselves. A fluid inlet 45 is formed in the housing 10 in communication with the control piston chamber 41 about centrally thereof. The fluid inlet 45 is adapted to permit fluid under pressure to pass into the control piston chamber 41 intermediate the control piston seals 43, 44. A fluid passage 46 interconnects the work piston chamber and the control piston chamber 41. The fluid passage 46 is so located that when the control piston 42 is at the end of the control piston chamber 41 as shown in solid lines in the drawing, hereafter referred to for convenience as the upper position, the O-ring seal 43 seals the fluid inlet 45 from the fluid passage 46, and when the control piston 42 is at the other end of the control piston chamber 41 as shown in the drawing in phantom, hereafter referred to as the lower position, the fluid inlet 45 is in communication with the fluid passage 46. Hence, when the control piston 42 is in the lower position the fluid introduced through the fluid inlet 45 flows through the fluid passage 46 and exerts pressure against the work piston 30. A work piston O-ring seal 31 is provided to form a fluid tight seal between the work piston 30 and the bore 11. Thus, fluid under sufficient pressure introduced through the fluid passage 46 will drive the work piston 30 to the forward position.

A work piston return spring 34 is disposed in the work piston chamber with one end abutting the face of the work piston oriented toward the opening 12 and the other end abutting an annular shoulder 13 formed internally of the work piston chamber. When the control piston 42 is located in the upper position the work piston return spring 34 drives the work piston 30 to the rearward position. The fluid contained between the work piston 30 and the bottom of the bore 11 is forced through the fluid passage 46 and is thence evacuated through a foraminous pad 49 transversely disposed across the control piston chamber 41.

In order to selectively drive the work piston reciprocally in the work piston chamber, the control piston 42 has a drive rod 47 which projects through the housing 10. A lever handle 50 is pivotally connected at one end to the housing 10 and is abuttable against the end of the control piston drive rod 47. When the handle is squeezed towards the housing 10 the handle 50 will drive the control piston to the lower position thus causing fluid under pressure to drive the work piston 30 to the forward position in the work piston chamber. When pressure is released from the handle 50 the control piston 42 is driven to the upper position by a control piston return spring 48 disposed in the control piston chamber 41 and abutting against the foraminous pad 49 and one end of the control piston 42 is compressive engagement.

Summarizing the operation, when the lever handle 50 is squeezed toward the housing the control piston 42 is driven to the lower position thus allowing fluid under pressure to flow through the fluid inlet 45 and through the fluid passage 46 to drive the work piston 30 to the forward position. As the work piston 30 is driven to the forward position, the cam follower 29 rides up the cam track 33 causing the cutting jaws 23, 24 to close. When pressure is released from the lever handle 50 the control piston return spring 48 drives the control piston 42 to the upper position thus sealing the fluid inlet 45 from the fluid passage 46. The work piston return spring 34 drives the work piston 30 to the rearward position and the fluid between the work piston 30 and the bottom of the bore 11 is forced through the fluid passage 46 and is exhausted through the foraminous pad 49. The cam follower 29 rides down the cam track 33 and the plier assembly spring 35 urges the cutting jaws 23, 24 to the open position.

In summary, it is believed that the invention essentially comprises a plier mechanism having fluid actuated cam means and a plier assembly actuatable by the cam means to selectively drive the plier mechanism between an open jaw position and a close jaw position.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

[1. Fluid actuated power pliers comprising, a housing, a pair of levers pivotally interconnected intermediate their opposite ends, said levers being carried by said housing, each of said levers having jaw means at one end thereof, cam track means reciprocally carried by said housing, at least one of said levers including cam follower means operably engaged with said cam track means, at least one of said levers swingable about said pivotal connection to move said jaw means between a widely spaced position and a relatively closely spaced position, said cam track means being positioned to co-act with said cam follower means to cause relative rotative movement of said levers by said reciprocal movement, fluid actuated means to selectively cause reciprocal movement of said cam track means in one direction, and means to selectively cause reciprocal movement of the cam track means in the other direction.]

[2. Fluid actuated power pliers comprising, a housing having a work piston chamber, a pair of levers partially disposed in said work piston chamber, said levers being pivotally interconnected intermediate their opposite ends, one lever being rigidly affixed to said housing, the other lever including cam follower means, each of said levers having jaw means at one end thereof, said other lever being swingable about said pivotal interconnection to move said jaw means between a relatively closely spaced position and a relatively widely spaced position, a work piston reciprocally disposed in said work piston chamber, said work piston including cam track means, said cam track means being positioned to co-act with said cam follower means to cause rotative movement of said other lever by said reciprocal movement, fluid actuated means to selectively cause reciprocal movement of said cam track means in one direction, and means to selectively cause reciprocal movement of said cam track in the other direction.]

[3. Fluid actuated power pliers comprising, an elongated housing having a work piston chamber formed therein, said work piston chamber having an opening at one end thereof, a work piston disposed in said work piston chamber and movable reciprocally therein, said work piston having a work rod projecting therefrom, said work rod including cam track means, a plier assembly having first and second levers each having a handle end and a jaw end, said levers being pivotally connected intermediate their opposite ends, the handle member of one of said levers being rigidly affixed to said housing, the handle member of the other lever being at least partially disposed in said chamber, the handle of said other lever including cam follower means positioned to engage said cam track means, said cam track means and cam follower means being co-actable to cause said other lever to pivotally move about said pivotal connection between a position wherein the jaw ends are relatively closely spaced and a position wherein the jaw ends are relatively widely spaced, fluid actuated means to selectively cause reciprocal movement of said piston in said work piston chamber in one direction, and spring means to selectively cause reciprocal movement of said piston in the other direction in said work piston chamber, whereby, reciprocal movement of said piston is translated through said cam track and cam follower means to cause rotative movement of said levers.]

[4. Fluid actuated power pliers comprising, an elongated housing having a work piston chamber formed therein, said work piston chamber having an opening at one end thereof, a work piston disposed in said work piston chamber and movable reciprocally therein, said work piston having a work rod projecting therefrom, said work rod including cam track means, a plier assembly having first and second levers each having a handle end and a jaw end, said levers being pivotally connected intermediate their opposite ends, said handle member of one of said levers being rigidly affixed to said housing, the handle member of the other lever being at least partially disposed in said work piston chamber, the handle of said other lever including cam follower means positioned to engage said cam track means, said cam track means and cam follower means being co-actable to cause said other lever to pivotally move about said pivotal connection between a position wherein the jaw ends are relatively closely spaced and a position wherein the jaw ends are relatively widely spaced, a control piston chamber formed in said housing, fluid passage means interconnecting said control piston chamber and one end of said work piston chamber, a control piston reciprocally disposed in said control piston chamber, fluid inlet means in communication with said control piston chamber, said control piston selectively movable between a position wherein said fluid inlet means communicates with said fluid passage means and a position wherein said fluid inlet means is sealed from said fluid passage means, said work piston being drivable reciprocally in one direction by an introduced fluid when said fluid inlet means communicates with said fluid passage means, and spring means to selectively cause reciprocal movement of said piston in the other direction in said work piston chamber when said fluid inlet means is sealed from said fluid passage means, whereby reciprocal movement of said piston is translated through said cam means and cam follower means to rotative movement of said levers.]

[5. In the device of claim 4, said control piston having a drive rod projecting through the housing, said housing having a lever handle abuttable with said drive rod positioned to drive said control piston in one direction, and spring means to drive said control piston in the other direction.]

*6 Fluid actuated pliers comprising a generally cylindrical housing having an axial bore, said bore defining a work piston chamber, said housing including a pair of threadedly engaged members, said bore being bottomed in one of said members and open through the other of said members, a work piston disposed in said work piston chamber and movable reciprocally therein, said work piston including cam track means projecting therefrom, said cam track means having a distal end portion slidably disposed adjacent the wall of said bore, a plier assembly having first and second levers, each of said levers having a handle end within said other member and a jaw end disposed outwardly of said other member, said levers being crossed and pivotally connected between their opposite ends, the handle end of one of said members being stationary and affixed to said housing and the handle end of the other of said levers being movable and at least partially disposed in said work piston chamber, said levers having an open position of said jaws wherein the movable handle end of said other lever is adjacent the wall of said bore and a closed position of said jaws wherein said handle ends are moved together, the handle end of said other lever including cam follower means positioned to being engaged by said cam track means in said open position, said cam track means and cam follower means being coactable to cause the handle end of said other lever to pivotally move about said pivotal connection toward the fixed handle end of said one lever, a plier assembly spring in compressive engagement between said*

*levers urging said handle ends apart, a control piston chamber formed in said one member of said housing, fluid passage means interconnecting said control piston chamber and said work piston chamber, a control piston reciprocally disposed in said control piston chamber, fluid inlet means in communication with said control piston chamber, said control piston being selectively movable between one position wherein said fluid inlet means communicates with said fluid passage means and another position wherein said fluid inlet means is sealed from said fluid passage means, said work piston being driveable reciprocally in one direction by an introduced fluid when said fluid inlet means communicates with said fluid passage means, and spring means to selectively cause reciprocal movement of said work piston in the other direction in said work piston chamber when said fluid inlet means is sealed from said fluid passage means, whereby reciprocal movement of said work piston is translated through said cam means and cam follower means to rotative movement of said levers.*

*7. Fluid actuated pliers as claimed in claim 6 wherein said control piston includes a control piston drive rod projecting laterally through said one member of said housing, and wherein said tool further comprises a lever handle pivotally connected to said one member at one end of said housing, said lever handle being abuttable against the end of said rod so that said lever handle will drive said control piston to said one position when said lever handle is squeezed, and a control piston return spring urging said control piston toward said another position.*

*8. Fluid actuated power pliers comprising a housing having a work piston chamber, a pair of levers partially disposed in said work piston chamber, said levers being crossed and pivotally interconnected intermediate their opposite ends, one lever being rigidly affixed to said housing, the other lever being movable and including cam follower means, each of said levers having jaw means at one end thereof, said other lever being swingable about said pivotal interconnection to move said jaw means between a relatively widely spaced position to a relatively closely spaced position, said cam follower means being adjacent the wall of said chamber in said widely spaced position and adjacent said fixed lever in said closely spaced position, a work piston reciprocally disposed in said work piston chamber, said work piston including cam track means, said cam track means being positioned to engage between said cam follower means and the wall of said chamber and to coact with said cam follower means to cause rotative movement of said other lever by said reciprocal movement, fluid actuated means to cause reciprocal movement of said cam track means in one direction and means to selectively cause reciprocal movement of said cam track means in the other direction.*

*9. Fluid actuated power pliers comprising an elongated housing having a work piston chamber formed therein, said work piston chamber having an opening at one end thereof, a work piston disposed in said work piston chamber and movable reciprocally therein, said work piston having a work rod projecting therefrom, said work rod including cam track means, said cam track means having a distal end movable adjacent the wall of said chamber, a plier assembly having first and second levers each having a handle end and a jaw end, said levers being crossed between their ends and pivotally interconnected, the handle end of one of said levers being rigidly affixed to said housing, the handle end of the other lever being movable and at least partially disposed in said chamber, The handle end of said other lever including cam follower means positioned to be engaged by said cam track means, said cam track means and cam follower means being coactable to cause the handle end of said other lever to pivotally move about said pivotal connection from a position wherein the jaw and handle ends are relatively widely spaced and a position wherein the jaw and handle ends are relatively closely spaced, fluid-actuated means to selectively cause reciprocal movement of said piston in said work piston chamber in one direction, and spring means to selectively cause reciprocal movement of said piston in the other direction in said work piston chamber, whereby reciprocal movement of said piston is translated through said cam track means and cam follower means to cause rotative movement of said other lever.*

*10. Fluid actuated pliers comprising an elongated housing having a work piston chamber formed therein, said work piston chamber having an opening at one end thereof, a work piston disposed in said work piston chamber and movable reciprocally therein, said work piston having a work rod projecting therefrom, said work rod including cam track means, a plier assembly having first and second levers each having a handle end and a jaw end, said levers being crossed and pivotally connected intermediate their opposite ends, the handle end of one of said levers being rigidly affixed to said housing, the handle end of the other of said levers being movable and at least partially disposed in said work piston chamber, the handle end of said other lever including cam follower means positioned to be engaged by said cam track means and cam follower means being coactable to force the handle end of said other lever toward the handle end of said one lever and to cause said other lever to pivotally move about said pivotal connection between a position wherein the jaw and handle ends are relatively widely spaced and a closed position wherein the jaw and handle ends are relatively closely spaced, a control piston chamber formed in said housing, fluid passage means interconnecting said control piston chamber at one end of said work piston chamber, a control piston reciprocally disposed in said control piston chamber, fluid inlet means in communication with said control piston chamber, said control piston being selectively movable between a position wherein said fluid inlet means communicates with said fluid passage means and a position wherein said fluid inlet means is sealed from said fluid passage means, said work piston being drivable reciprocally in one direction by an introduced fluid when said fluid inlet means communicates with said fluid passage means, and spring means to selectively cause reciprocal movement of said piston in the other direction in said work piston chamber when said fluid inlet means is sealed from said fluid passage means, whereby reciprocal movement of said piston is translated to said cam track means and cam follower means to rotative movement of said levers.*

References Cited by the Examiner

The following references, cited by the Examiner, are of record in the patented file of this patent or the original patent.

UNITED STATES PATENTS

| | | | |
|---|---|---|---|
| 2,355,520 | 8/44 | Fischer et al. | 81—15 X |
| 2,490,086 | 12/49 | Page | 30—228 |
| 2,733,506 | 2/56 | Wild | 30—228 |

FOREIGN PATENTS

| | | |
|---|---|---|
| 1,017,299 | 9/52 | France. |
| 722,160 | 1/55 | Great Britain. |

WILLIAM FELDMAN, *Primary Examiner.*